US007810562B2

(12) United States Patent
Tu et al.

(10) Patent No.: US 7,810,562 B2
(45) Date of Patent: Oct. 12, 2010

(54) IN-SITU FORMATION OF SOLIDS FOR WELL COMPLETIONS AND ZONAL ISOLATION

(75) Inventors: Huilin Tu, Cambridge, MA (US); Agathe Robisson, Cambridge, MA (US); Partha Ganguly, Woburn, MA (US); Mathew M Samuel, Sugar Land, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 144 days.

(21) Appl. No.: 12/189,572

(22) Filed: Aug. 11, 2008

(65) Prior Publication Data

US 2009/0159287 A1 Jun. 25, 2009

Related U.S. Application Data

(60) Provisional application No. 61/014,969, filed on Dec. 19, 2007.

(51) Int. Cl.
*E21B 33/13* (2006.01)
*E21B 33/138* (2006.01)
*E21B 43/25* (2006.01)

(52) U.S. Cl. .................. 166/248; 166/249; 166/276; 166/292; 166/294; 166/300; 507/234; 507/254

(58) Field of Classification Search .................. 166/248, 166/249, 276, 292, 294, 300; 507/233, 234, 507/254, 265, 269
See application file for complete search history.

(56) References Cited

U.S. PATENT DOCUMENTS

| | | | |
|---|---|---|---|
| 3,747,677 A * | 7/1973 | Richardson | ............ 166/293 |
| 3,965,986 A | 6/1976 | Christopher | |
| 5,168,928 A | 12/1992 | Terry et al. | |
| 5,836,390 A * | 11/1998 | Apps et al. | ............ 166/281 |
| 6,209,646 B1 * | 4/2001 | Reddy et al. | ............ 166/300 |
| 6,431,280 B2 * | 8/2002 | Bayliss et al. | ............ 166/263 |
| 6,439,309 B1 * | 8/2002 | Matherly et al. | ............ 166/276 |
| 7,021,376 B2 * | 4/2006 | Bayliss et al. | ............ 166/263 |
| 7,431,089 B1 * | 10/2008 | Couillet et al. | ............ 166/307 |

(Continued)

FOREIGN PATENT DOCUMENTS

EP 0260888 A 3/1988

(Continued)

OTHER PUBLICATIONS

Beckman Coulter, "Introduction to Capillary Electrophoresis", handbook, 47 pages, retrieved from http://en.scientificcommons.org/19934453 on May 13, 2010.

(Continued)

*Primary Examiner*—George Suchfield
(74) *Attorney, Agent, or Firm*—Bridgid Laffey; Vincent Loccisano; James McAleenan

(57) ABSTRACT

A sol of metallic alkoxide is pumped into a desired location in a wellbore and allowed to gel, creating solids in-situ. The sol is either unstabilized, requiring rapid placement before gelling, or the sol is stabilized, permitting off-site mixing. Sols can be stabilized with either surfactant or with interfacial polymers. Large concentrations of surfactant can be placed in the sol to create templates around which gelation occurs, creating porous solids.

17 Claims, 5 Drawing Sheets

U.S. PATENT DOCUMENTS

| | | | |
|---|---|---|---|
| 7,608,567 B2 * | 10/2009 | Saini | 507/221 |
| 2005/0107263 A1 * | 5/2005 | Bland et al. | 507/203 |
| 2009/0250218 A1 * | 10/2009 | Akarsu et al. | 166/292 |
| 2009/0260819 A1 * | 10/2009 | Kurian et al. | 166/292 |

FOREIGN PATENT DOCUMENTS

| | | | |
|---|---|---|---|
| WO | 02053873 A | 7/2002 | |
| WO | 2005045186 A | 5/2005 | |
| WO | 2007135617 A | 11/2007 | |

OTHER PUBLICATIONS

Morgan, "The effect of fillers on the interfacial polymer properties from cryogenic dynamic mechanical measurements", Journal of Materials Science 9, 1974, p. 1219-1226.

Suslick et al, "Applications of Ultrasound to Materials Chemistry", Annu. Rev. Mater. Sci. 1999, 29:295-326.

Patent Cooperation Treaty, "International Search Report", dated Mar. 26, 2009, 4 pages.

* cited by examiner

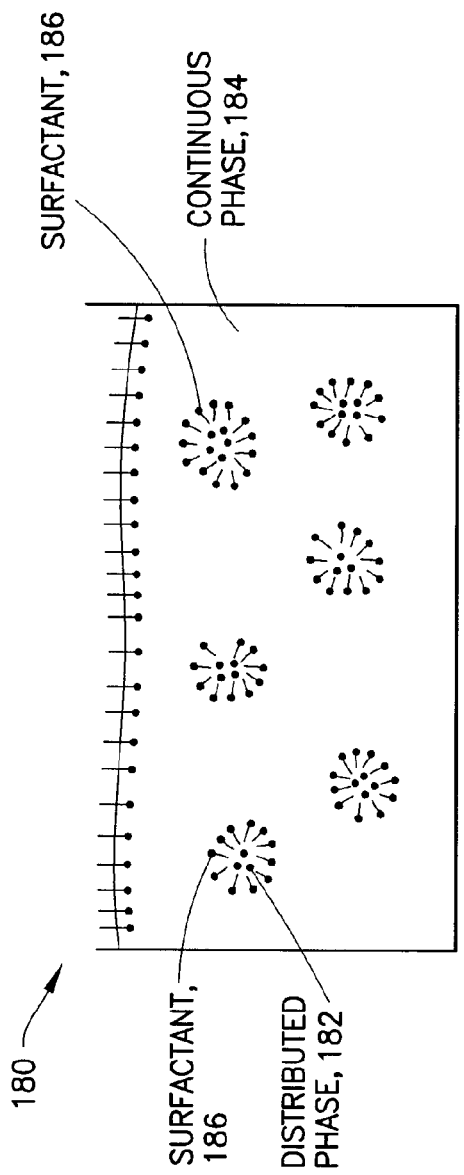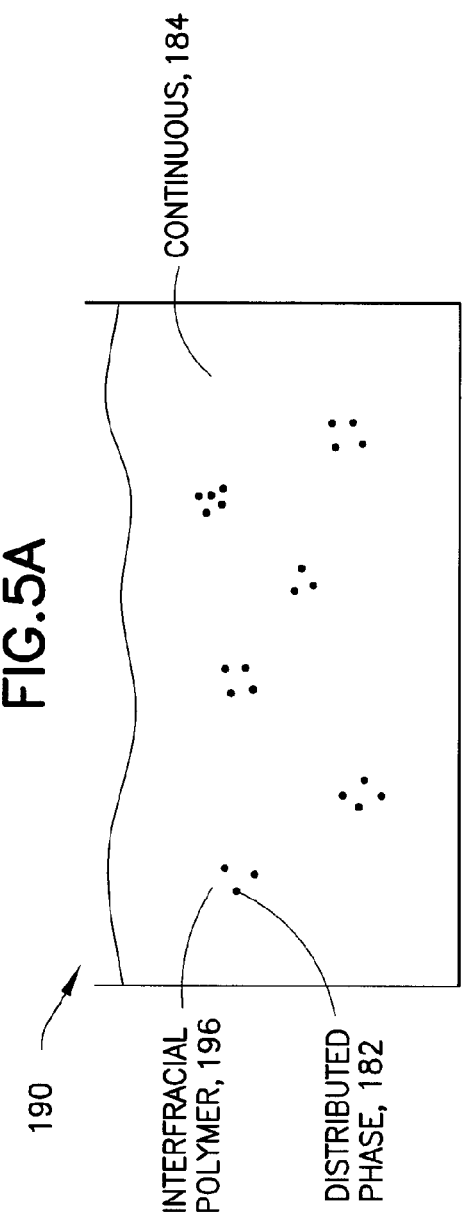

IN-SITU FORMATION OF SOLIDS FOR WELL COMPLETIONS AND ZONAL ISOLATION

CROSS-REFERENCE TO RELATED APPLICATIONS

This application claims benefits from U.S. Provisional Patent Application No. 61/014,969 filed Dec. 19, 2007, the contents of which are hereby incorporated herein by reference.

TECHNICAL FIELD

The present invention relates to placement of solids in a wellbore or in a fracture. In particular, the present invention relates to placing a sol of hydrolyzed metallic alkoxides into a wellbore or in a fracture that gels and hardens in-situ.

BACKGROUND OF THE INVENTION

In well completions and during wellbore plugging and abandonment, it is often necessary to place solid material at different locations in the well. Generally, this is done by pumping a slurry, a fluid mixed with solid material, into the wellbore to the desired location in the subsurface formation. For example, it is often desirable to place a plug in a wellbore to isolate different zones within the formation; as when hydrocarbon bearing zones, that are typically found deeper in the wellbore, are isolated from shallower water bearing zones, to prevent contamination of the aquifer. In this case, concrete, a slurry of cement and gravel, is pumped into the wellbore and permitted to harden.

In other wellbore completion operations, such as gravel packing or fracturing, slurries are pumped under high pressure and at high velocity into the wellbore. In gravel packing, the slurry, which typically consists of gravel in water, is pumped into the wellbore to an angular flow diverter to pack the annulus between the wellbore and the casing with gravel, to prevent the production of formation sand. In fracturing, the slurry includes a proppant, typically sand, that is pumped into the formation to stimulate low-permeability reservoirs and to keep the fracture open. In each of the above cases, the solid material in a slurry is hard, irregularly shaped and may flow at high velocity. Therefore, slurries tend to be highly abrasive, and the machinery that pumps and controls the slurries is subject to abrasive wear and reduced longevity.

Abrasive wear occurs when the particles within the fluid impact on the exposed surfaces of the machinery and impart some of their kinetic energy into the exposed surface. If sufficiently high, the kinetic energy of the impacting particles creates significant tensile residual stress in the exposed surface, below the area of impact. Repeated impacts cause the accumulation of tensile stress in the bulk material that can leave the exposed surface brittle and lead to cracking, crack linkage and gross material loss.

Typically, components that are exposed to abrasive flows are subject to various hard facing treatments to improve abrasion resistance. Such treatments often include either surface preparations that harden and smooth the base material itself or bonding abrasion-resistant materials to the surface of the base material. Surface preparations can often make the base material more resistant to impact from particles with low kinetic energy, but these same preparations can leave the base material more brittle and thus susceptible to cracking as a result of impacts from high kinetic energy particles. Bonding of abrasion-resistant materials is typically performed using thermal spray techniques such as High Velocity Oxy-Fuel (HVOF) or Air Plasma Spray (APS). However, in highly abrasive environments, the residual tensile stress that results from multiple impacts can accumulate at the junction of a base material and its bonded coating, leading to delamination of the coating material.

Because of the harshly abrasive environment of wellbore operations, significant effort and expense is expended to mitigate abrasive loss and improve wellbore tool and equipment life. Hard facing treatments, as described above, are used extensively to protect a wide array of wellbore tools. Also, wellbore tools and equipment are often over-designed to provide adequate service life. However, all of these steps routinely prove inadequate to provide sufficient protection from abrasion, and wellbore operations are often interrupted to replace broken tools that were unable to withstand the prolonged stress.

Another recurrent issue with the use of abrasive slurries is that pumping them requires a considerable expenditure of energy. The same mechanisms that lead to abrasive wear also lead to resistance to flow in the form of friction between the slurry and the piping used to transfer the slurry from the surface to the formation. If this friction could be reduced, more of the surface pressure would be transferred to the formation, leading to more efficient fracturing operations. The polymers used in fracturing and friction reducers added to the fracturing fluid formulations could minimize this effect.

From the foregoing it will be apparent that there is a need for an improved method of placing solids in a wellbore that does not expose wellbore equipment to the abrasive effects of slurry flow of material and permits greater pumping and fracturing efficiency.

BRIEF DESCRIPTION OF THE DRAWINGS

FIGS. 5A and 5B show stabilized sols. FIG. 5A shows stabilization with surfactants. FIG. 5B shows stabilization with interfacial polymers.

DETAILED DESCRIPTION OF THE INVENTION

Figure 1:
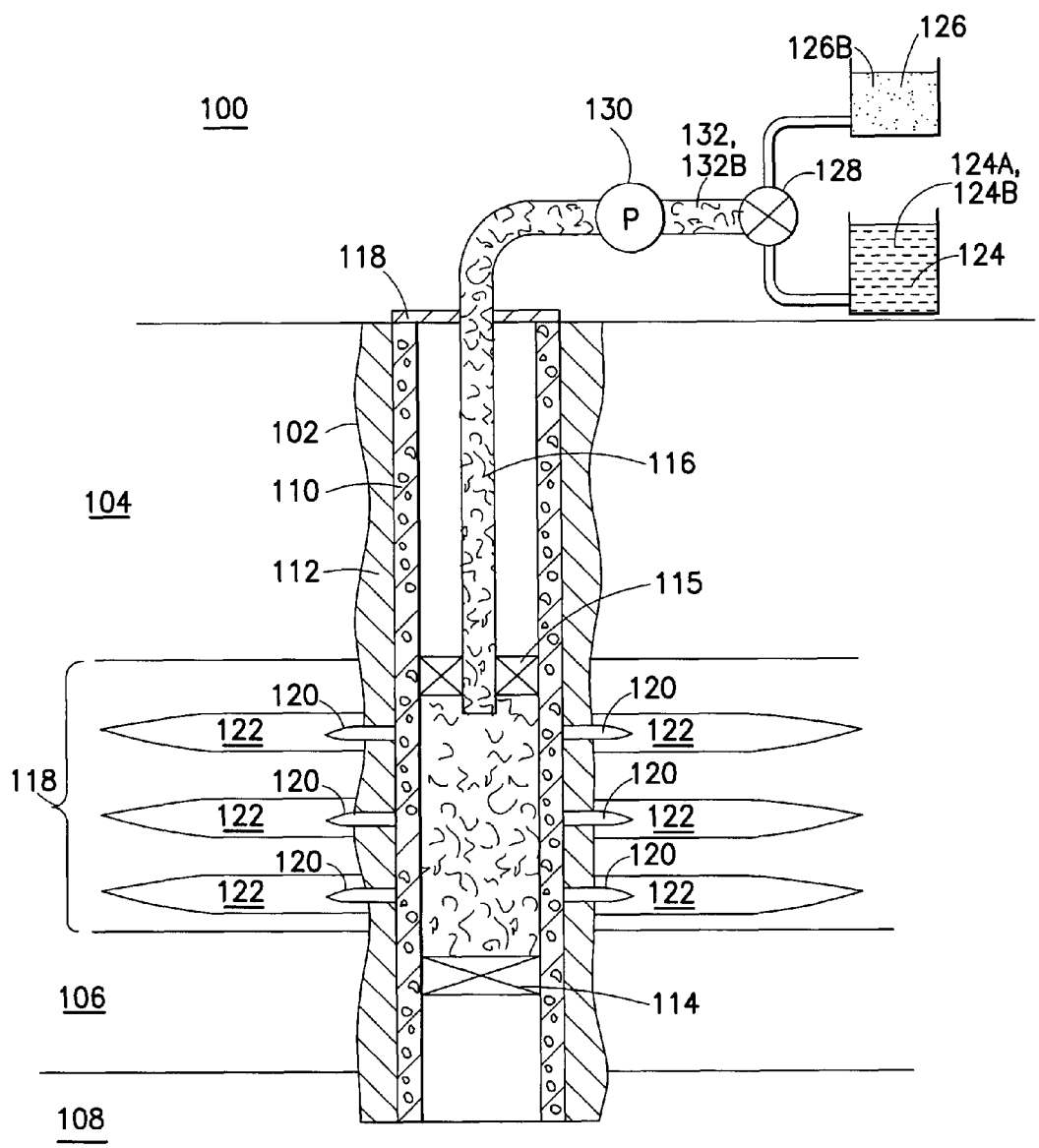
FIG. 1 shows a wellbore hydraulic fracturing operation of the prior art that is adaptable to the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the detailed description, each numerical value should be read once as modified by the term "about" (unless already expressly so modified), and then read again as not so modified unless otherwise indicated in context. Also, in this detailed description, it should be understood that any cited numerical range listed or described as being useful, suitable, or the like, should be considered to include any and every point within the range, including the end points. For example, "a range of from 1 to 10" is to be read as indicating each and every possible number along the continuum between about 1 and about 10. Thus, if any or all specific data points within the range, or conversely no data points within the range, are explicitly identified or referred to, it is to be understood that inventors appreciate and understand that any and all data points within the range are to be considered to have been specified, and that inventors convey possession of the entire range and all points within the range.

Introduction

Disclosed herein are methods of placing solids in a wellbore that do not involve the pumping of highly abrasive slurries. Instead, species such as colloids made up of monomers of the appropriate solids mixed with suitable reactants are pumped into the wellbore to the desired location and allowed to polymerize, hardening into the intended solids in-situ. The process by which monomers in an emulsion are polymerized is known as the sol-gel process. Through variations in the composition of the emulsions and the conditions during polymerization, a wide variety of metallic oxides with designed porosities can be created, as is known in the art of colloid chemistry.

While several specific examples of colloid chemistry and the sol-gel process are given below, it will be recognized that the processes and methods described are by way of illustration, and that the wellbore conditions (e.g., chemistry including pH, temperature, pressure, presence of and type of hydrocarbons in the formation) will dictate the details of application, as is known in the art. It should be further recognized that the examples of solid placement in a wellbore are typical, and that the examples described are not intended to be limiting cases. Rather, the methods of using the sol-gel process to place solids in a wellbore are applicable generally, whenever solids are needed in a wellbore.

FIG. 1 illustrates a hydraulic fracturing operation, depicted generally as 100. A wellbore 102 is drilled through an overburden layer 104, through a productive formation 106, and further into the underlying formation 108. Casing 110 is placed into the wellbore 102 and the annulus between the wellbore 102 and the casing 110 is filled with cement 112. The fracture treatment zone 118, the section of the productive formation 106 that is to be fractured, is isolated from the underlying formation 108 by a lower packer 114 and from the overburden layer 104 (FIG. 2) by an upper packer 115. A tubing string 116 runs from the wellbore cap 118 through the upper packer 115, and ends within the fracture treatment zone 118. In the fracture treatment zone 118, the casing 110 and the cement sheath 112, are perforated 120 by a perforating gun (not shown), permitting communication of hydrocarbons from the productive formation 106 into the wellbore 102. In order to improve the flow of hydrocarbons from the productive formation 106, a fracturing fluid 124 is combined with a proppant 126 in a mixer 128 to form a slurry 132. The proppant 126 is typically silica sand or other particulate solid material. The slurry 132 is pumped through the tubing string 116 by the pump 130 and forced through the perforations 120 and on into the productive formation 106, forming cracks or fractures 122 in the productive formation 106. The proppant 126 in the slurry 132 is wedged into the fractures 122, holding the fractures 122 open after pumping stops. In this way, the fractures 122 filled with proppant 126 form a permeable conduit for the continued flow of hydrocarbons from the productive formation 106.

Figure 2:
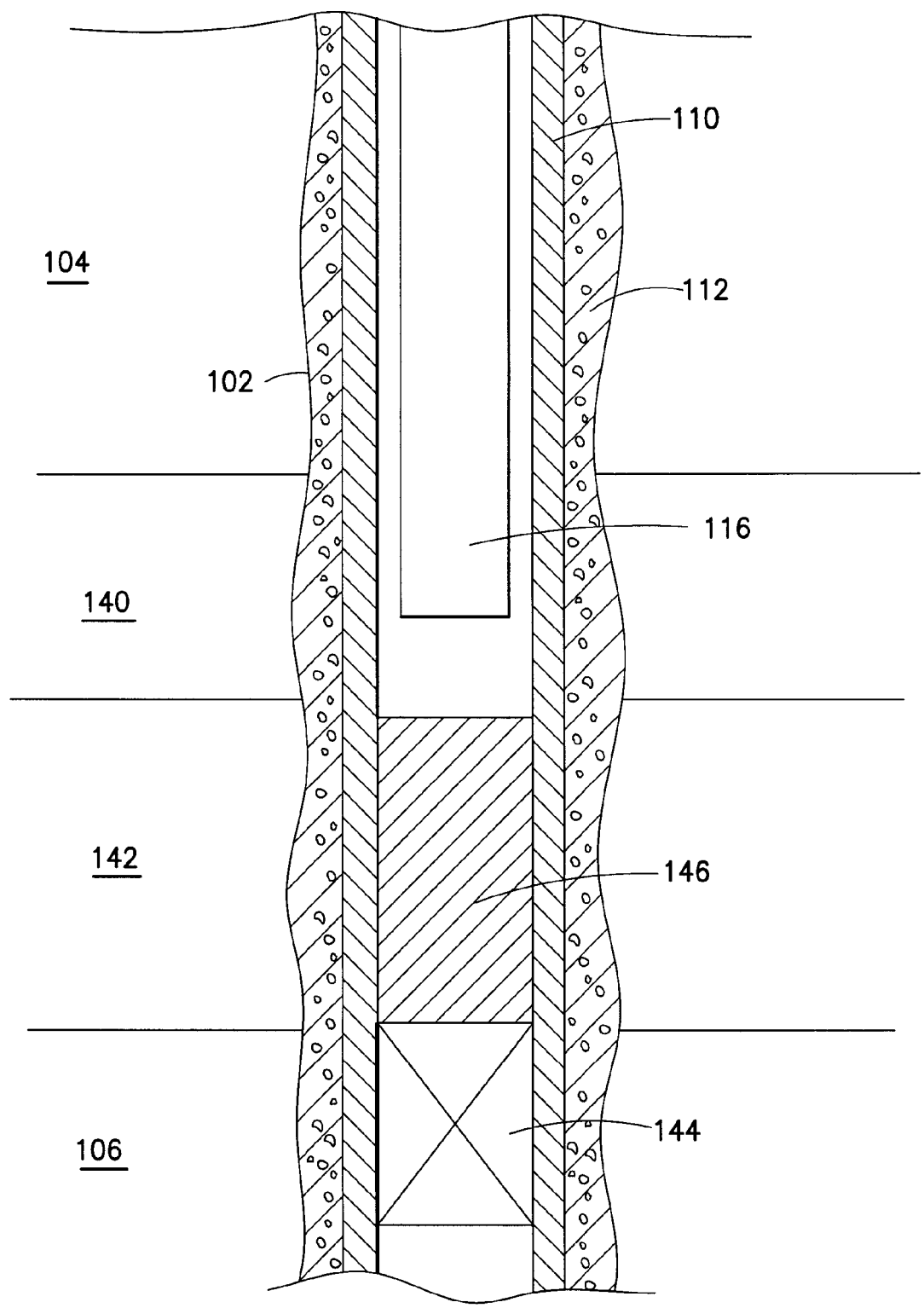
FIG. 2 shows a wellbore plug of the prior art that is adaptable to the present invention.

In hydraulic fracturing, the proppant is chosen for its porosity and resistance to compaction. In other applications, it is desirable for the solids placed in the wellbore 102 to be non-porous. FIG. 2 illustrates a plug 146. When a well is being completed, it is often desirable to isolate the productive formation 106. One example is when the productive formation 106 is separated from a water bearing formation 140 by an impermeable rock formation 142. Here, a bridge plug 144 is placed in the wellbore 102 and concrete (not shown) is pumped from the surface through the tubing string 116 and permitted to harden into a plug 146. The plug 146 forms an impenetrable barrier between the hydrocarbons in the productive formation 106 and the water in the water bearing formation 140.

Because both the fracturing fluid 132 used in hydraulic fracturing and the concrete (not shown) used in wellbore plug and completion operations contain a significant amount of solids which are often pumped at high pressure, the pump 130 and other equipment are subject to the constant scrubbing of highly abrasive slurries. To improve upon this situation, the present disclosure shows pumping of colloids instead of slurries, and initiating polymerization in the emulsion to form the desired solids. It is also to be expected that pumping of such colloids will lead to improved pumping efficiency compared to the pumping of harsh slurry materials.

The Sol-Gel Process

A colloid is a homogeneous mixture of two or more phases: one or more dispersed phases and a continuous phase. The dispersed phases typically consist of small particles or droplets that are dispersed in the continuous phase. If both the continuous phase and the distributed phase are liquids, the colloid is called an emulsion. When the continuous phase is a liquid and the distributed phase is a solid, the colloid is called a sol. A gel is a colloid with a solid continuous phase and a liquid distributed phase.

The sol-gel process involves the polymerization of inorganic matter in a sol into an inorganic network in a gel, as the name implies. A simple example is silicic acid (with a general formula of $[SiO_x(OH)_{4-2x}]_N$) in solution. Silicic acid is soluble and stable in water if the concentration of $SiO_2$ is less than about 100 ppm. Above 100 ppm, $Si(OH)_4$ begins to polymerize into siloxane groups (—Si—O—Si—) over time, forming a gel according to formula 1:

$$—SiOH + HOSi— \rightarrow —Si—O—Si— + H_2O \qquad 1$$

More generally, alkoxides of metallic elements or silicon (referred to collectively as alkoxides, and shown as MOR, where M is the base element and R is an organic substituent) have the similar properties of being soluble in water and readily polymerize into a gel state. Examples include alkoxysilanes such as tetramethoxysilane (TMOS) and tetraethoxysilane (TEOS), aluminates, titanates and borates. For simplicity and consistency, the following examples use silicon as the base element. However, it should be understood that other base elements may be freely substituted, as is known in the art.

The sol-gel process is characterized by three reactions: hydrolysis, water condensation and alcohol condensation. These reactions are shown below:

$$Si(OR)+H_2O \rightarrow Si(OH)+ROH \text{ (hydrolysis)} \qquad 2$$

$$Si(OH)+Si(OH) \rightarrow \text{—Si—O—Si—}+H_2O \text{ (water condensation)} \qquad 3$$

$$Si(OH)+Si(OR) \rightarrow \text{—Si—O—Si—}+ROH \text{ (alcohol condensation)} \qquad 4$$

Here, because the alkoxides react easily with water, hydrolysis begins according to formula 2, creating hydroxyl monomers. With the appearance of hydroxyl monomers, condensation begins, formulas 3 and 4, first with the monomers combining and lengthening into dimers and trimers, and then aggregating to form larger particles. As the condensation and aggregation continues, the particles thus formed begin to link together, forming chains and larger networks which eventually extend through the entire liquid medium, forming a gel.

Figure 3:
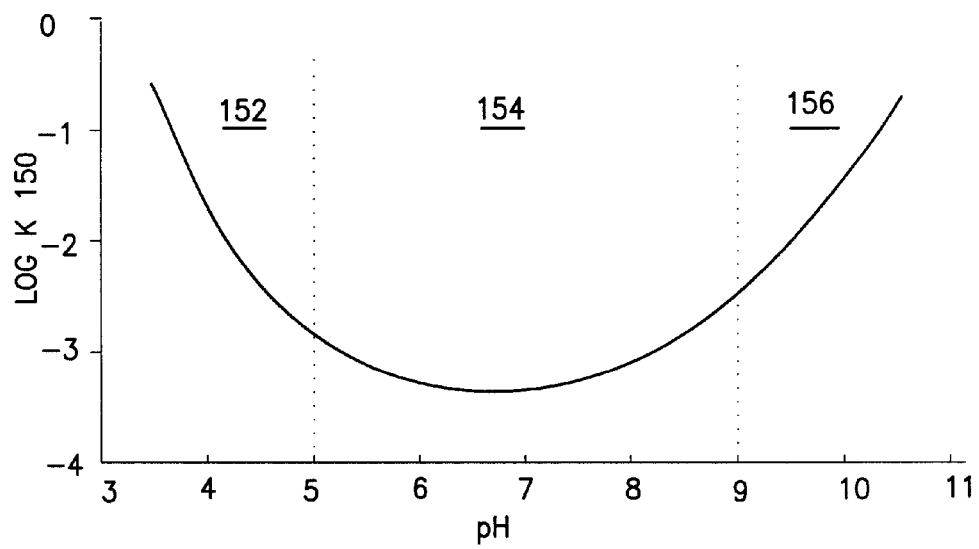
FIG. 3 shows a typical pH rate profile for hydrolysis of an alkoxide in an aqueous solution.

As may be implied by the above formulas, the resulting gel's final structure is dictated by the initial concentration of alkoxide in solution, the pH of the solution, the presence of catalysts and other factors. In particular, the pH of the solution affects both the rate of polymerization, and the resulting gel structure. FIG. 3 shows a typical pH rate profile for hydrolysis in an aqueous solution. The rate 150 is given as the logarithm of the observed reaction rate coefficient. At low pH 152 and high pH 156, the reaction rate is higher, as can be implied from formulas 3 and 4, where alcohol condensation is catalyzed by the H+ concentration found in acidic solutions 152, and water condensation is catalyzed by the OH— concentration found in basic solutions 156. Neutral solutions 154 tend to lead to the slowest hydrolyses and condensation, and thus to the slowest gelation of the subject sol.

Figure 4:
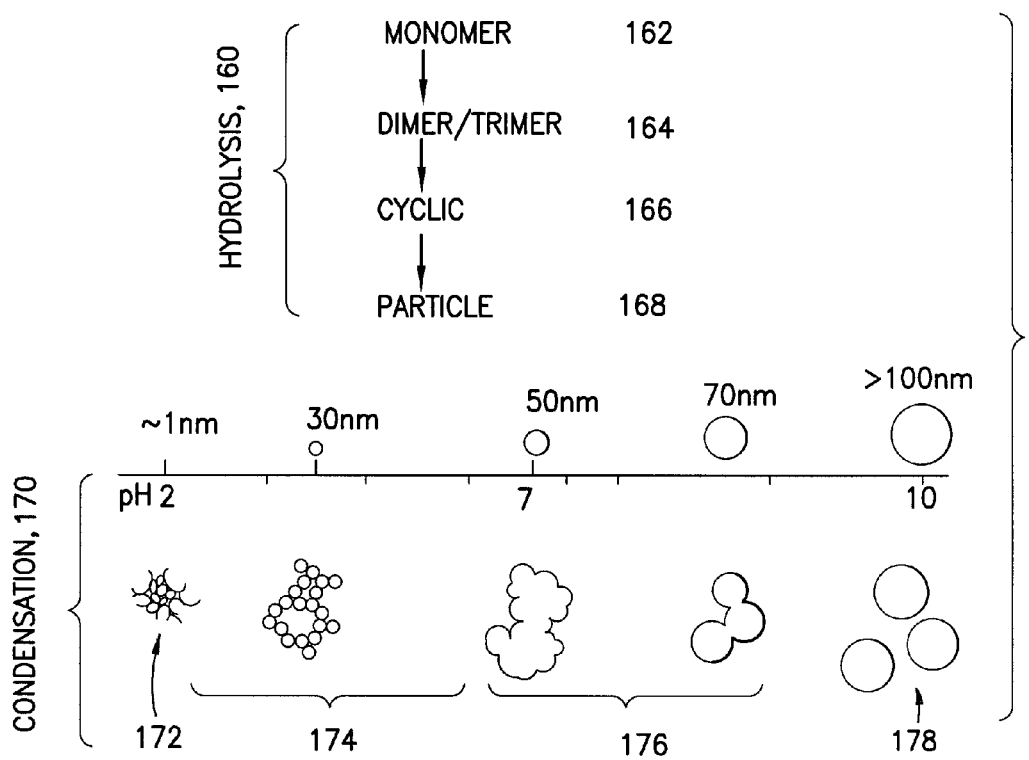
FIG. 4 shows the evolution of particles in the sol-gel process under varying pH conditions.

The pH of the sol also has significant impact on the structure of the gel produced. FIG. 4 shows the development of particles in a typical sol-gel process. At the top of the figure, hydrolysis 160 is represented, with alkoxide monomers 162 joining to form dimers 164 and other higher order molecules, which in turn form cyclic molecules 166 and ultrafine particles 168 (i.e., much less than 1 nanometer). Here, the pH of the sol mainly affects the mechanism by which the sol evolves (i.e., whether water condensation, formula 3, or alcohol condensation, formula 4, predominates). However, the pH of the sol has significant impact on condensation 170. At low pH 172 (i.e., pH less than about 2.0), the solubility of silica is low, so particle formation, ripening of smaller particles into larger particles, and aggregation of particles into chains and networks are limited. Therefore, in low pH conditions, the gels formed consist of closely packed small particles of about 1 nanometer. When the pH of the sol is in the 2 to 6 range 174, solubility is still low, but particle formation favors more highly condensed species combining with less condensed species and ripening begins, so particle size increases to 2-4 nanometers. Additionally, aggregation creates longer chains and larger networks. When the pH of the sol exceeds 6 (176), the highly condensed species aggressively combine with the less condensed species creating larger particles, and ripening creates fewer particles of larger size (i.e., up to 100 nanometers). While aggregation occurs, the fact that there are fewer particles of larger size means that there is less tendency for the particles to aggregate, so the resulting gel is more loosely packed. As the sol becomes more basic (178), the sol may not gel at all.

The method of placing solids in a well will be more fully discussed below. However, here it is important to note that because alkoxides in solution begin gelling almost immediately, the hydrolysis step that forms the sol must be done on-site in the well, and there is a time sensitive element to the use of the sol-gel process as discussed thus far. This is not to be considered an undue or added burden upon wellbore completion and abandoning processes, since the use of time sensitive materials is already a part of those processes (e.g., when cement is used).

Stabilized Sols

The sol-gel process, as described above, is a time sensitive matter, and requires some level of mixing on-site. However, in another embodiment, the initial sols of hydrolyzed alkoxides are stabilized so that mixing can be done off site, and gelation is inhibited until the desired moment. In most colloids, the continuous phase and the distributed phases have different charge affinities and the natural tendency is for the phases of a colloid to coalesce into separate, non-mixed phases. The two main methods of stabilizing a sol are through addition of a surfactant to the sol, and through encapsulation of the distributed phase with an interfacial polymer.

A surfactant is an organic compound that is amphiphilic, having a hydrophobic (water-hating) tail and a hydrophilic (water-loving) head. Surfactants serve to reduce the interfacial tension between the phases of the sol. The effects of high concentrations of surfactant in a sol will be discussed below. FIG. 5a shows a surfactant stabilized sol 180 of hydrolyzed alkoxide 182 (the distributed phase) and water 184 (the continuous phase) with a small concentration of surfactant 186 added. Here, the hydrophilic heads of the surfactant 186 are attracted to the water 184 of the continuous phase, and the hydrophobic tails of the surfactant 186 are drawn together, away from the water 184. This is seen by the coating of surfactant 186 on the surface of the water 184. This tendency is called micellation. Also, because of the different charge affinity of the alkoxide 182, the tails of the surfactant 186 will be attracted to the alkoxide particles 182, and the surfactant 186 will form a barrier between the water 184 and the alkoxide 182, inhibiting gelation, and counteracting the tendency of the distributed phase to coalesce. Typical surfactants 186 include alkyl sulfate salts like sodium dodecyl sulfate (SDS) or ammonium lauryl sulfate, sodium lauryl ether sulfate (SLES) and soaps or fatty acid salts. Sols 180 stabilized with amphipathic surfactants 186 are stable for a long time if the conditions of the sol 180 remain unchanged, but their effectiveness tends to be subject to factors such as the pH, temperature or pressure of the sol 180, and the concentration of the surfactant 186.

In another embodiment, shown in FIG. 5b, an interfacial polymer stabilized sol 190 of hydrolyzed alkoxide 182 and water 184 combined with an interfacial polymer 196. Here, the interfacial polymer 196 attaches to the surface of the alkoxide particles 182 and interlink to form a rigid barrier around the particle. This can be done as a separate process step, as is known in the art of microencapsulation and microemulsions. These encapsulated alkoxide particles 182 are very stable and remain stable after mixing into a sol.

While stabilized sols resist coalescing for long periods of time, the stabilization also inhibits the particle growth, aggregation and ripening required for gelation to occur. Therefore, gelation of stabilized sols requires some action to break down the barriers. As mentioned above, surfactants 186 tend to be sensitive to the conditions in the surfactant stabilized sol 180. As such, the controlled manipulation of the subject sol 180 is useful in initiating gelation. For example, some surfactants 186 will swell or contract with changes in sol 180 pH, so the release of the particles 182 into the sol 180 can be initiated by pH adjustment. Other mechanisms which can serve to initiate gelation are changes in sol 180 temperature or pressure, or introduction of an electric current into the sol 180 to disrupt the surfactant's 186 tendency to micellate. While particles 182 that are encapsulated with interfacial polymers 196 are less susceptible to minor changes in the conditions of the interfacial polymer stabilized sol 190, these mechanisms remain viable in some circumstances. In addition, interfacial polymer 196 encapsulation can be ruptured or broken by shear stress or cavitation in the sol 190, which mechanism is easily produced by subjecting the sol 190 to an ultrasound signal, or, as in the case of a fracture fluid in a formation, by the crushing force of the formation on the sol 190 when the overpressure from the fracturing operation is released.

From the above, it can be seen that each of the embodiments described (unstabilized sols, surfactant stabilized sols 180 and interfacial polymer stabilized sols 190) has its own advantages and disadvantages in a wellbore environment. Unstabilized sols are relatively easy to mix, and gelation occurs without any intervening action. However, they begin to gel as soon as the sol begins to hydrolyze, so time is a factor. Surfactant stabilized sols 180 can be premixed, so on-site preparation is simplified. On the other hand, stability may be affected by changes in chemistry in the wellbore and initiation of gelation may require additional equipment. Finally, interfacial polymer stabilized sols 190 may be prepared in advance and they are highly stable, but they require additional equipment to initiate gelation.

Building a Porous Matrix

As described above, the sol-gel process creates solid networks of particles through particle formation, aggregation and ripening. The networks thus formed are homogeneous and, depending on the conditions of the sol during condensation, composed of a wide variety of particle sizes and network structures. However, in general, the gels are either impermeable to fluid flow or only slightly permeable. As such, the gels are more suitable for creating wellbore plugs. When fracturing fluid is desired, a more permeable network is necessary. In this case, gelation around a template and a flushing of the template material after gelation creates a more porous material. Further, by designing the structure of the templates, the porosity can be designed into the process.

Figure 6:
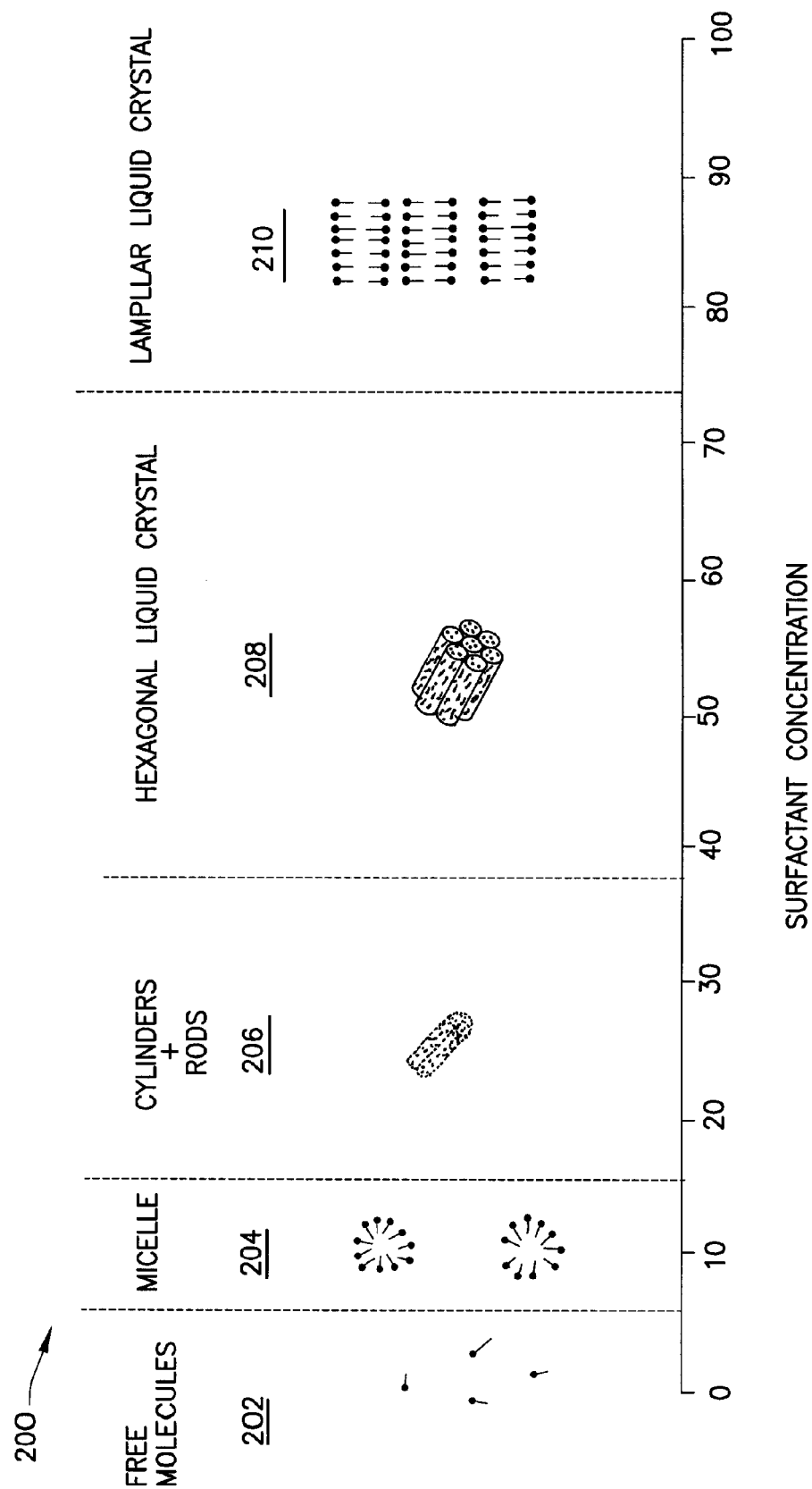
FIG. 6 show the behavior of surfactants in solution as the surfactant concentration increases.

FIG. 6 shows the behavior of surfactants in solution as surfactant concentration increases 200. At very low surfactant concentration, the surfactant exists as free molecules 202. As concentration increases, the hydrophobic tails aggregate away from the solution, forming spherical agglomerations called spherical micelle 204. With further increases in surfactant concentration, the spherical micelle 204 combine to form cylindrical and longer rod shaped micelle 206. Further concentration increases lead to aggregation of the cylindrical and rod shaped micelle 206 into hexagonal arrays 208 and lamellar sheets 210 of liquid crystal. This behavior of surfactant in solution 200 permits the creation of templates around which the sol-gel process occurs. Example surfactants include small organic surfactants such as sodium dodecyl sulfate (SDS) or cetyltrimethylammonium bromide (CTAB) or polymeric surfactants like polyethylene oxide-co-propylene oxide-co-ethylene oxide (PEO-PPO-PEO) which is commercially available in different grades with various molecular weights (supplied by BASF). Here, increasing the size of the hydrophobic constituent of the surfactant (e.g., by lengthening the PPO block) results in increased pore size. In a further embodiment, if macroscopic pores are desired, large quantities of hydrophobic polymer can be added as inert filler to occupy substantial volumes of the resulting gel. When gelation is complete, the surfactant can be flushed out with a suitable solvent, leaving a porous gel network intact. While flushing may be done by pumping the solvent into the wellbore, a preferred embodiment involves selecting surfactants and hydrophobic polymers that are soluble in hydrocarbons, and using the hydrocarbons in the productive formation to flush the gel.

Sol-Gels in Wellbore Operations

Sol-gels are a useful alternative to slurries in wellbore operations where placement of solids in the wellbore is required, because a sol consists of smaller particles that are not as abrasive to wellbore equipment and flow with less friction. For this reason, the use of sol-gels will lead to longer equipment life and greater efficiency in wellbore operations. As noted above, sol-gels can be used to create nonporous solids and highly permeable solids, depending on the conditions during gelation and the presence of other factors in the sol. In order to transport heavy proppant, we have to use high viscosity fluids and optimization of these fluids for high temperature application can be difficult. In this invention, proppants are replaced by sol-gel and hence, viscosity of the fluid to suspend the proppant is not required.

As one example when plugs are required, an unstabilized sol that is highly to moderately acidic is suitable to form a densely packed gel rapidly and so is a substitute for concrete. Here, the sol is formed on the surface by combining an alkoxide with water and adjusting the pH, and immediately pumping it into place to harden into a plug. Stabilized sols are also useful if the appropriate equipment to initiate gelation is on site.

In fracturing, the uncontrolled gelation that occurs in unstabilized sols is not desirable. However, a stabilized sol mixed with appropriately large quantities of surfactant can be pumped into a productive formation as the fracturing fluid, and then, when the fracturing is complete, gelation can be initiated by breaking down the stabilizing material. In some cases, the crushing force of the productive formation on the fracturing sol will be sufficient to initiate gelation. Then, if the surfactant is chosen to be soluble in hydrocarbons, the productive flow from the formation will serve to flush the surfactant from the network.

As another example, if a gravel pack is desired to prevent the production of formation sand, a sol with large amounts of hydrophobic polymer can be pumped in place and permitted to gel. In this case, the sol can be either stabilized or unstabilized.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about A to about B," or, equivalently, "from approximately A to B," or, equivalently, "from approximately A-B") disclosed herein is to be understood as referring to the power set (the set of all subsets) of the respective range of values. Accordingly, the protection sought herein is as set forth in the claims below.

From the foregoing it will be appreciated that using the sol-gel process to place solids such as plugs or proppant laden fracturing fluid in a wellbore as described herein will lead to longer equipment life and greater efficiency in wellbore operations.

We claim:

1. A method of placing solids in a desired location within a subsurface formation accessed through a wellbore comprising
   pumping a colloid of hydrolyzed metallic alkoxides into the wellbore to the desired location within the subsurface formation; and
   maintaining the colloid at the desired location while gelation and hardening of the colloid proceeds through polymerization of the hydrolyzed metallic alkoxides.

2. The method of placing solids in a desired location within a subsurface formation accessed through a wellbore of claim 1 wherein the colloid of hydrolyzed metallic alkoxides has a pH of less than 2.

3. The method of placing solids in a desired location within a subsurface formation accessed through a wellbore of claim 1 wherein the colloid of hydrolyzed metallic alkoxides has a pH of between 2 and 7.

4. The method of placing solids in a desired location within a subsurface formation accessed through a wellbore of claim 1 wherein the colloid of hydrolyzed metallic alkoxides has a pH of greater than 7.

5. A method of placing solids in a desired location within a subsurface formation accessed through a wellbore comprising:
   pumping a colloid of encapsulated particles of a hydrolyzed metallic alkoxide into the wellbore to the desired location within the subsurface formation; and
   breaking down the encapsulation around the particles, thereby initiating the gelation of the colloid through polymerization of the hydrolyzed metallic alkoxides.

6. The method of placing solids in a desired location within a subsurface formation accessed through a wellbore of claim 5 wherein the particles of hydrolyzed metallic alkoxide are encapsulated by a surfactant.

7. The method of placing solids in a desired location within a subsurface formation on accessed through a wellbore of claim 5 wherein the particles of hydrolyzed metallic alkoxide are encapsulated by an interfacial polymer.

8. The method of placing solids in a desired location within a subsurface formation accessed through a wellbore of claim 7 wherein:
   the interfacial polymer is susceptible to break-down by swelling with changes in pH of the continuous phase of the colloid; and
   the breaking down of the encapsulant comprises pumping a solution to the desired location within the subsurface formation, said solution being of a pH chosen to break down the interfacial polymer.

9. The method of placing solids in a desired location within a subsurface formation accessed through a wellbore of claim 7 wherein:
   the interfacial polymer is susceptible to break-down by degradation with changes in pH of the continuous phase of the colloid; and
   the breaking down of the encapsulant comprises pumping a solution to the desired location within the subsurface formation, said solution being of a pH chosen to break down the interfacial polymer.

10. The method of placing solids in a desired location within a subsurface formation accessed through a wellbore of claim 7 wherein:
    the interfacial polymer is susceptible to break-down by pressure changes in the colloid; and
    the breaking down of the encapsulant comprises changing the pressure in the wellbore.

11. The method of placing solids in a desired location within a subsurface formation accessed through a wellbore of claim 7 wherein:
    the interfacial polymer is susceptible to break-down by cavitation effects in the colloid; and
    the breaking down of the encapsulant comprises subjecting the colloid to ultrasound.

12. The method of placing solids in a desired location within a subsurface formation accessed through a wellbore of claim 7 wherein:
    the interfacial polymer is susceptible to break-down by shear stress; and
    the breaking down of the encapsulant comprises subjecting the colloid to ultrasound.

13. The method of placing solids in a desired location within a subsurface formation accessed through a wellbore of claim 7 wherein:
    the interfacial polymer is susceptible to break-down by introduction of an electrical current into the colloid; and
    the breaking down of the encapsulation of the particles comprises introducing an electrical current into the colloid.

14. A method of placing porous solids in a desired location within a subsurface formation accessed through a wellbore comprising:
    pumping a colloid of hydrolyzed metallic alkoxides and a micellated surfactant into the wellbore to the desired location within the subsurface formation,
    maintaining the colloid at the desired location while gelation and hardening of the colloid through polymerization of the hydrolyzed metallic alkoxides proceeds, resulting in a hardened porous matrix surrounding the micellated surfactant; and
    flushing the surfactant from the resulting hardened porous matrix.

15. A method of placing porous solids in a desired location within a subsurface formation accessed through a wellbore comprising:
    pumping a colloid of encapsulated particles of a hydrolyzed metallic alkoxide and a micellated first surfactant into the wellbore to the desired location within the subsurface formation; and
    breaking down the encapsulation around the particles, thereby initiating the gelation of the colloid by through polymerization of the hydrolyzed metallic alkoxides, resulting in a hardened porous matrix surrounding the first surfactant; and
    flushing the first surfactant from the resulting hardened porous matrix.

16. The method of placing porous solids in a desired location within a subsurface formation accessed through a wellbore of claim 15 wherein the particles of hydrolyzed metallic alkoxide are encapsulated by a second surfactant.

17. The method of placing porous solids in a desired location within a subsurface formation accessed through a wellbore of claim 15 wherein the particles of hydrolyzed metallic alkoxide are encapsulated by an interfacial polymer.

* * * * *